(12) United States Patent
Cross

(10) Patent No.: US 10,612,649 B2
(45) Date of Patent: Apr. 7, 2020

(54) CLUTCHED FLYWHEEL TRANSMISSION

(71) Applicant: Flybrid Automotive Limited, Leyland (GB)

(72) Inventor: Douglas Cross, Milton Keynes (GB)

(73) Assignee: Flybrid Automotive Limited, Leyland (GB)

( * ) Notice: Subject to any disclaimer, the term of this patent is extended or adjusted under 35 U.S.C. 154(b) by 1006 days.

(21) Appl. No.: 15/080,965

(22) Filed: Mar. 25, 2016

(65) Prior Publication Data

US 2016/0208911 A1 Jul. 21, 2016

Related U.S. Application Data

(63) Continuation of application No. 13/519,281, filed as application No. PCT/GB2010/052127 on Jan. 4, 2010, now Pat. No. 9,300,184.

(51) Int. Cl.
| | |
|---|---|
| *B60K 6/10* | (2006.01) |
| *F16H 61/04* | (2006.01) |
| *F16F 15/30* | (2006.01) |
| *H02K 7/02* | (2006.01) |
| *F16H 57/04* | (2010.01) |

(52) U.S. Cl.
CPC .............. *F16H 61/04* (2013.01); *B60K 6/105* (2013.01); *F16F 15/30* (2013.01); *F16H 57/043* (2013.01); *F16H 57/0412* (2013.01); *F16H 57/0473* (2013.01); *H02K 7/025* (2013.01); *F16H 2061/044* (2013.01); *F16H 2061/0462* (2013.01); *Y02E 60/16* (2013.01); *Y02T 10/6204* (2013.01); *Y10T 74/19614* (2015.01)

(58) Field of Classification Search
CPC ...... F16H 3/006; F16H 57/0006; F16H 57/04; F16F 15/30; B60K 6/105; H02K 7/02; H02K 7/025
USPC ................. 74/329, 331, 333, 572.2; 180/165
See application file for complete search history.

(56) References Cited

U.S. PATENT DOCUMENTS

| | | | | |
|---|---|---|---|---|
| 3,749,194 A | * | 7/1973 | Bardwick, III | .......... B60K 6/10 180/165 |
| 4,276,951 A | | 7/1981 | Smitely | |
| 4,342,371 A | | 8/1982 | Smitley | |
| 6,684,148 B2 | * | 1/2004 | Chess | ................... B60W 10/02 701/67 |
| 8,718,889 B2 | * | 5/2014 | Jensen | ..................... F16H 33/02 180/165 |
| 9,300,184 B2 | | 3/2016 | Cross | |

FOREIGN PATENT DOCUMENTS

| | | |
|---|---|---|
| DE | 2029572 | 12/1971 |
| EP | 0159445 | 3/1986 |
| EP | 2055519 | 5/2009 |

(Continued)

*Primary Examiner* — William C Joyce
(74) *Attorney, Agent, or Firm* — Stetina Brunda Garred & Brucker

(57) ABSTRACT

An energy storage and recovery system device for a vehicle, comprising a flywheel, a first and a second set of gears, and multiple wet multi-plate clutches, wherein one of each gear set is arranged coaxially along a clutch shaft with one of the clutches, and wherein the device is coupled to the vehicle transmission, such that actuation of a clutch redirected the torque path via the gears, thereby enabling multiple ratios and therefore multiple speeds.

18 Claims, 6 Drawing Sheets

(56) References Cited

FOREIGN PATENT DOCUMENTS

| GB | 2111612 | 7/1983 |
|---|---|---|
| JP | 57127154 | 8/1982 |
| WO | WO2009103591 | 8/2009 |

\* cited by examiner

CLUTCHED FLYWHEEL TRANSMISSION

CROSS-REFERENCE TO RELATED APPLICATIONS

This application is a continuation of U.S. patent application Ser. No. 13/519,281, filed Dec. 17, 2010

STATEMENT RE: FEDERALLY SPONSORED RESEARCH/DEVELOPMENT

Not Applicable

BACKGROUND

This invention relates to a self-contained Energy Storage and Recovery System (ESRS) device for use in a vehicle, and specifically to an ESRS device comprising a high speed flywheel, i.e. a flywheel which can run at speeds greater than 20,000 revs, such as that disclosed in the Applicant's Patent No. GB2449117.

Currently known mechanical ESRS devices comprise a Continuously Variable Transmission (CVT) to transfer torque between the flywheel and the vehicle. The efficiency of torque transfer in a CVT-based ESRS device is dependent upon power, and only exhibits a high efficiency at high power levels.

BRIEF SUMMARY

An aim of the present invention is to provide a mechanical ESRS device which is smaller, lighter and less expensive than prior art embodiments and which may, for example, be fitted efficiently to less powerful and lighter vehicles than has hitherto been possible.

Accordingly, the present invention provides, in a first aspect, an Energy Storage and Recovery System device as claimed in claim 1.

In a second aspect, the present invention provides a vehicle comprising a transmission shaft, wherein an ESRS device in accordance with the first aspect of the invention is mounted coupled to the transmission shaft.

An advantage of the present invention is that the multiple number of available gear ratios combined with the ability to slip clutches, provides a close approximation to the CVT of prior art embodiments, therefore resulting in a high round trip efficiency, for example of around 65% but with weight and cost savings. Furthermore, the device can change smoothly from one clutch to another, therefore eliminating the potential for torque discontinuity.

A further advantage of the present invention is that the device can be retrofitted onto current vehicles.

Furthermore, the efficiency of the torque transfer through the clutch-based transmission is completely independent of the power being transferred.

The device allows seamless transfer from one gear to another without torque interruption, and also negates the requirement for a gear change mechanism. Furthermore, the duration of the slip on each clutch is maintained at a short duration, thereby resulting in simpler thermal management.

Preferably the multiple clutches are wet multi-plate clutches, wherein a cooling oil flow is supplied to the center of each clutch. The temperature of the clutches can thereby be maintained at an acceptable level, thereby prolonging the life of the clutches.

Preferably, a lubricant is supplied, via jets, to gear teeth as they come out of mesh, thereby controlling the temperature of the gear teeth, which would otherwise be high due to the high running speed of the flywheel, and also ensuring good lubrication.

Preferably each of the gears is located coaxially with a corresponding one of the gears and the respective clutch is a coaxially mounted wet, multi-plate clutch located between the respective gears.

Preferably, the weight of the ESRS device is less than 20 kg, thereby optimizing the efficiency of the vehicle into which it is fitted.

In a second aspect, the present invention provides a vehicle comprising a transmission input shaft, wherein an energy storage and recovery system device in accordance with the first aspect of the invention is coupled to the shaft.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

Figure 1:
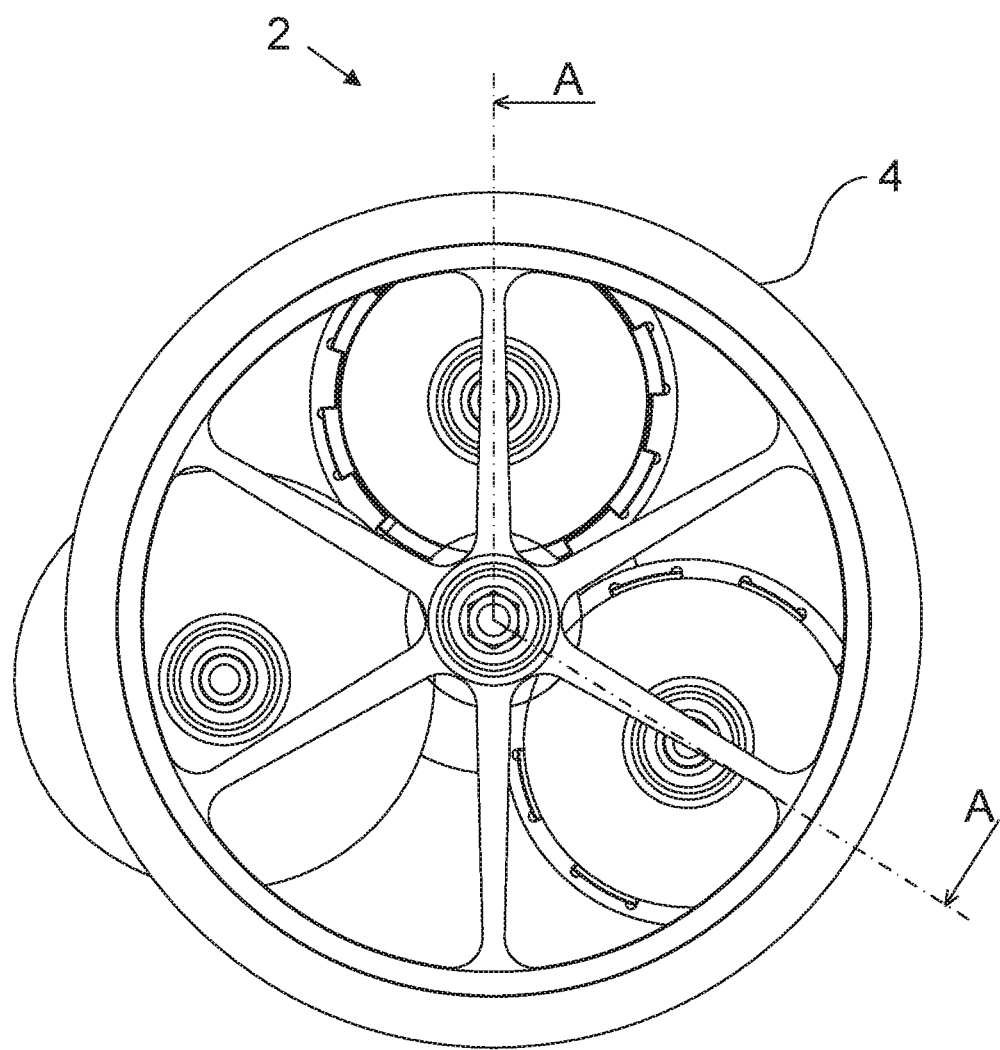
FIG. 1 is a front view of a ESRS device in accordance with the present invention.
Figure 2:
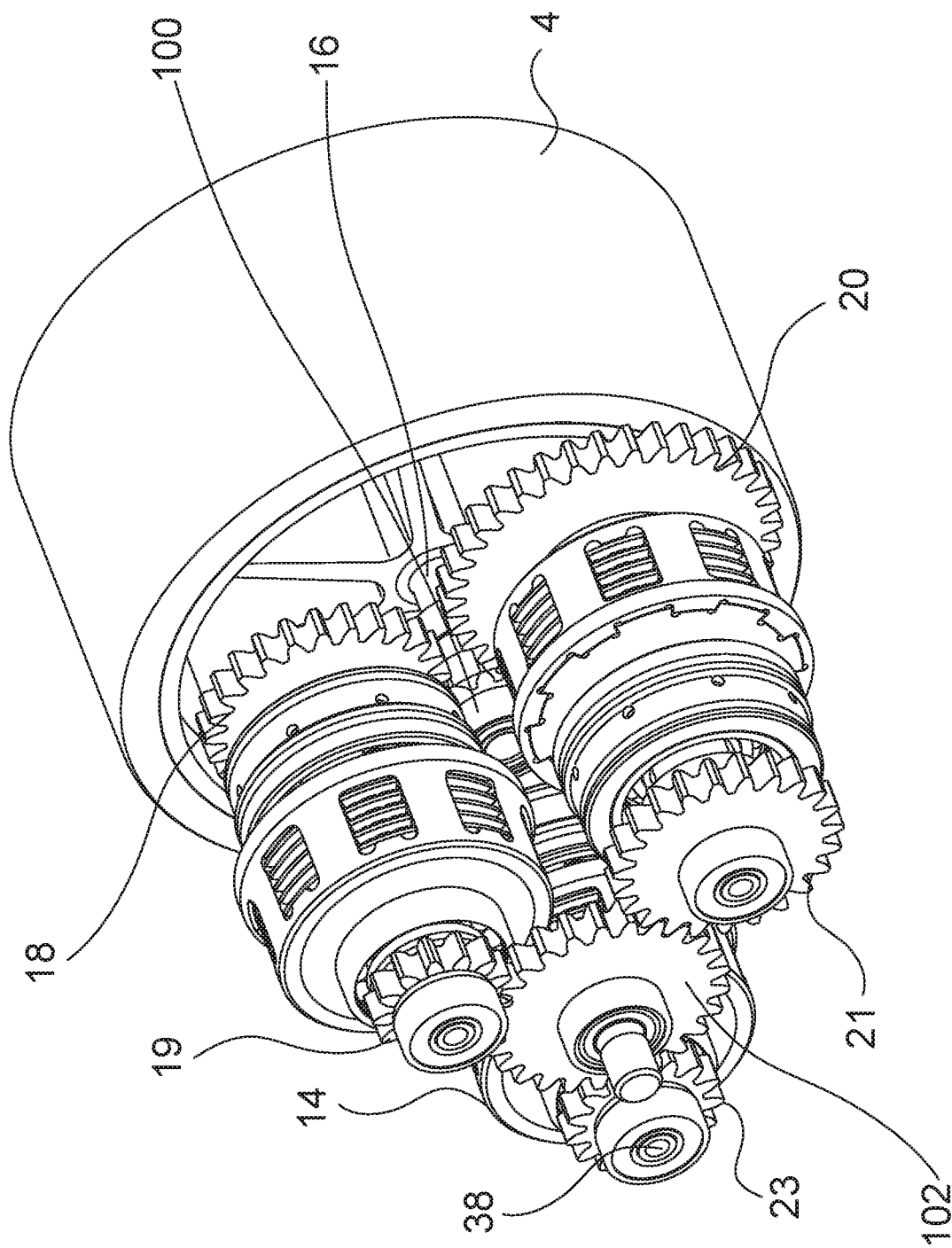
FIG. 2 is an isometric view of the ESRS device of FIG. 1.
Figure 3:
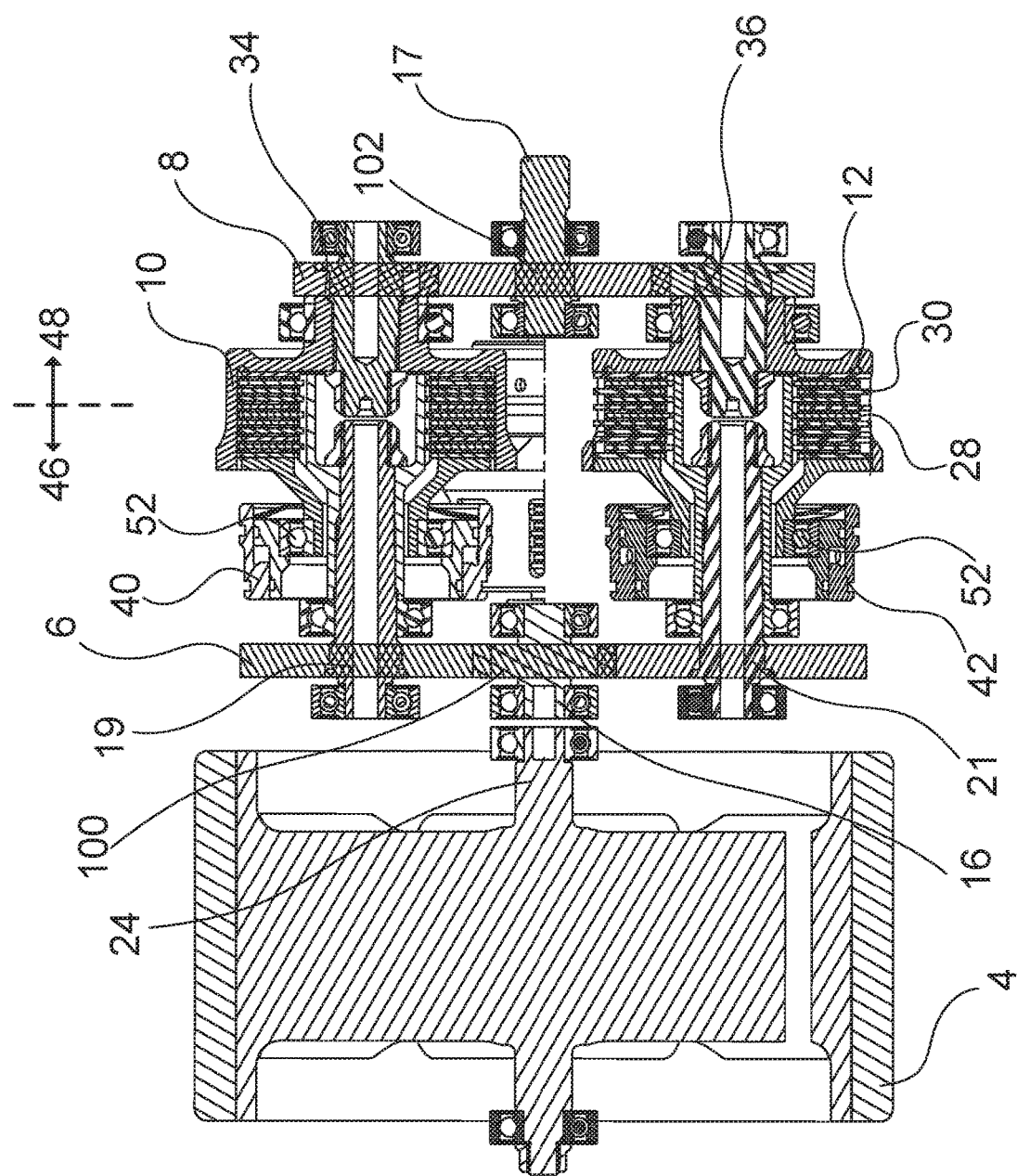
FIG. 3 is a cross-sectional view through section A-A of FIG. 1.

With reference to the FIGS. 1 to 3, the present invention comprises an Energy Storage and Recovery System (ESRS) device 2. The device 2 comprises a flywheel 4, a first set of gears 6, a second set of gears 8, multiple wet multi-plate clutches 10, 12, 14, and clutch shafts 34, 36, 38. The first set of gears 6 is constantly meshed via a first idler gear 100 mounted on a flywheel side, input shaft 16, and the second set of gears 8 is constantly meshed via a second idler gear 102 mounted on a vehicle side, output shaft 17.

The device is typically coupled to the torque path between the vehicle engine and the input shaft of the vehicle transmission.

An output shaft 24 of the flywheel 4 is connected to the input shaft 16 of the first set of gears 6 and the output shaft 17 of the second set of gears 8 is arranged for coupling to the input shaft (not shown) of the vehicle's own gearbox. It will be appreciated that in the nature of a ESRS device, energy flows both into and out of the flywheel and thus the use of the terms input and output in relation to the device can in most cases be reversed depending on the operating mode i.e. whether energy is being stored in or released from the flywheel.

The first set of gears 6 is located adjacent the flywheel, the second set of gears 8 remote from the flywheel, and the clutches 10, 12, 14 are located between the first set of gears 6 and the second set of gears 8 as described below.

The first of gears comprises three gears 18, 20, 22, (22 is located at the rear of FIG. 3 and is therefore not indicated), which are in constant mesh with one another, and the second set of gears also comprises three gears 19, 21, 23 which are in constant mesh with one another. One gear of each set of gears 6, 8 is located either side of each of the clutches 10, 12, 14, such that each gear of a set has a dedicated clutch, i.e. on each clutch shaft is mounted one of the first set of gears 6, one of the clutches 10, 12, 14, and one of the second set of gears 8. Each of the gears 18, 20, 22 is located coaxially with a corresponding one of the gears 19, 21, 23 and the respective clutch 10, 12, 14 is a coaxially mounted wet, multi-plate clutch located between the respective gears.

The clutches 10, 12, 14 are normally open, conventional wet multiple plates comprising a first set of plates 28 and a second set of plates 30. Each of the clutches 10, 12, 14 are individually actuatable, via an actuator 40, 42, 44 associated with each clutch 10, 12, 14, respectively (actuator 44 is located at the rear of FIG. 3 and is therefore not indicated). The actuator 40, 42 or 44 pushes the clutch plates 28, 30, together, via a load-path which includes a bearing 52, therefore rotation of the actuator 40, 42 or 44 is not required. The actuator 40, 42 or 44 creates a normal force on the clutch plates 28, 30, which increases the torque in the clutch 10, 12 or 14, according to the equation:

$$F = \mu \times N$$

(F=friction force at the mean friction radius, μ=coefficient of friction of the clutch plates, N=normal force provided by the actuator).

The friction force F, acting at the mean friction radius provides the friction torque of the clutch 10, 12 or 14.

In the case where the flywheel 4 is delivering energy to the vehicle transmission, the flywheel side 46 of the clutch 10, 12 or 14 has a higher rotational speed than the vehicle side 48. Closing the clutch 10, 12 or 14 with pressure from the actuator 40, 42 or 44 causes energy to be lost at a power equal to the friction torque multiplied by the speed of the flywheel side 46 of the clutch 10, 12 or 14 (Watts=Nm× Rad/sec). The power arriving at the vehicle is equal to friction torque times the speed of the vehicle side of the clutch. The power lost to heating the clutch is friction torque multiplied by the difference in rotational speed across the clutch 10, 12 or 14. Thus the efficiency is only a function of speed difference across the clutch, not of rate of energy transfer.

When one of the clutches 10, 12 or 14 is actuated, the torque path is redirected, via the first set of gears 6, along the clutch shaft 34, 36, or 38 associated with the actuated clutch 10, 12 or 14, and via the second set of gears 8.

In normal operation of the device 2, one clutch 10, 12, 14 is usually slipping to provide the torque transfer from the flywheel 4 to the vehicle transmission or vice versa. As the speed across the selected clutch reduces to near zero, the next closest ratio is selected by applying pressure to the new clutch and removing pressure from the current clutch in a smooth manner.

As each gear 18, 20, 22, has a corresponding clutch seamlessly transmission from one gear to another is effected, without torque interruption. Furthermore, the slip event on each clutch 10, 12, 14 is only for a short time. The actuator pressure may be made dependent on (typically proportional to) the vehicle's braking or accelerating torque to provide controlled slippage of the relevant clutch and also to reduce parasitic losses from the hydraulic pump.

Because the clutches 10, 12, 14 are individually actuatable, multiple clutches can be actuated simultaneously. Actuation of multiple clutches will cause each of the actuated clutches to slip, thereby controlling the amount of energy sent to the flywheel to avoid over speed conditions or to reduce the speed of the flywheel 4. The energy is dissipated as heat in the cooling lubricant, extracted from the clutches. This mode of operation has the effect of providing additional vehicle braking via the main transmission which helps, for example, to maintain a similar brake balance to a mode in which energy is being added to the flywheel.

In this embodiment, embodiment, the device 2 can run at three ratios although other numbers of ratios could be provided. Therefore, the total number of available speeds is three multiplied by the number of speeds available in the main vehicle transmission, i.e. a 5 speed vehicle transmission would result in a total of 15 available speeds taken between the road wheels and the device flywheel, a 6 speed transmission in 18 total speeds, and a 7 speeds transmission in 21 total speeds.

Thus by simultaneously controlling or reading the vehicle's Transmission Control Module (TCM) to select appropriate gears in the main transmission and controlling the ratio in the device 2, any necessary slippage in the clutches 10, 12, 14 may be minimized for optimal efficiency. The overall ratio may then be selected to store energy in the flywheel (by choosing ratios to speed it up) during energy storage modes, or extracting energy by gradually slowing the flywheel down by loading it through the device's gears and into the vehicle's main transmission input shaft during energy recovery modes.

Figure 4:
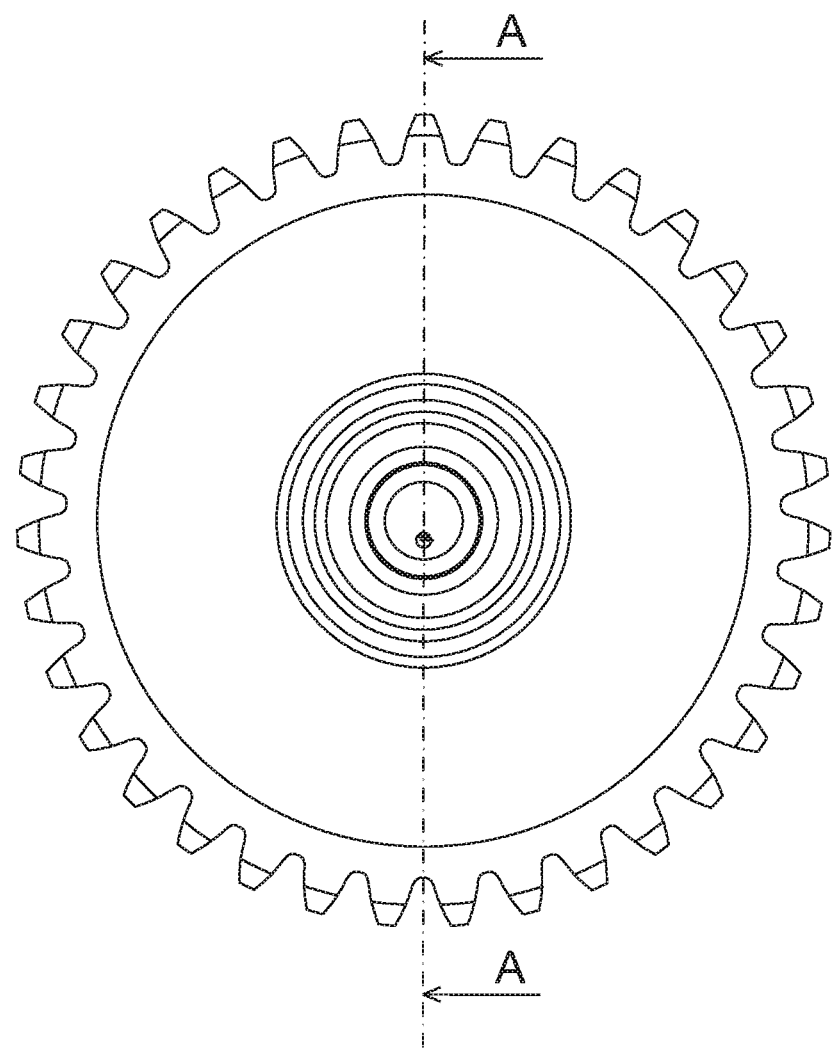
FIG. 4 is a front view of the lubrication system of the clutches of FIG. 1.
Figure 5:
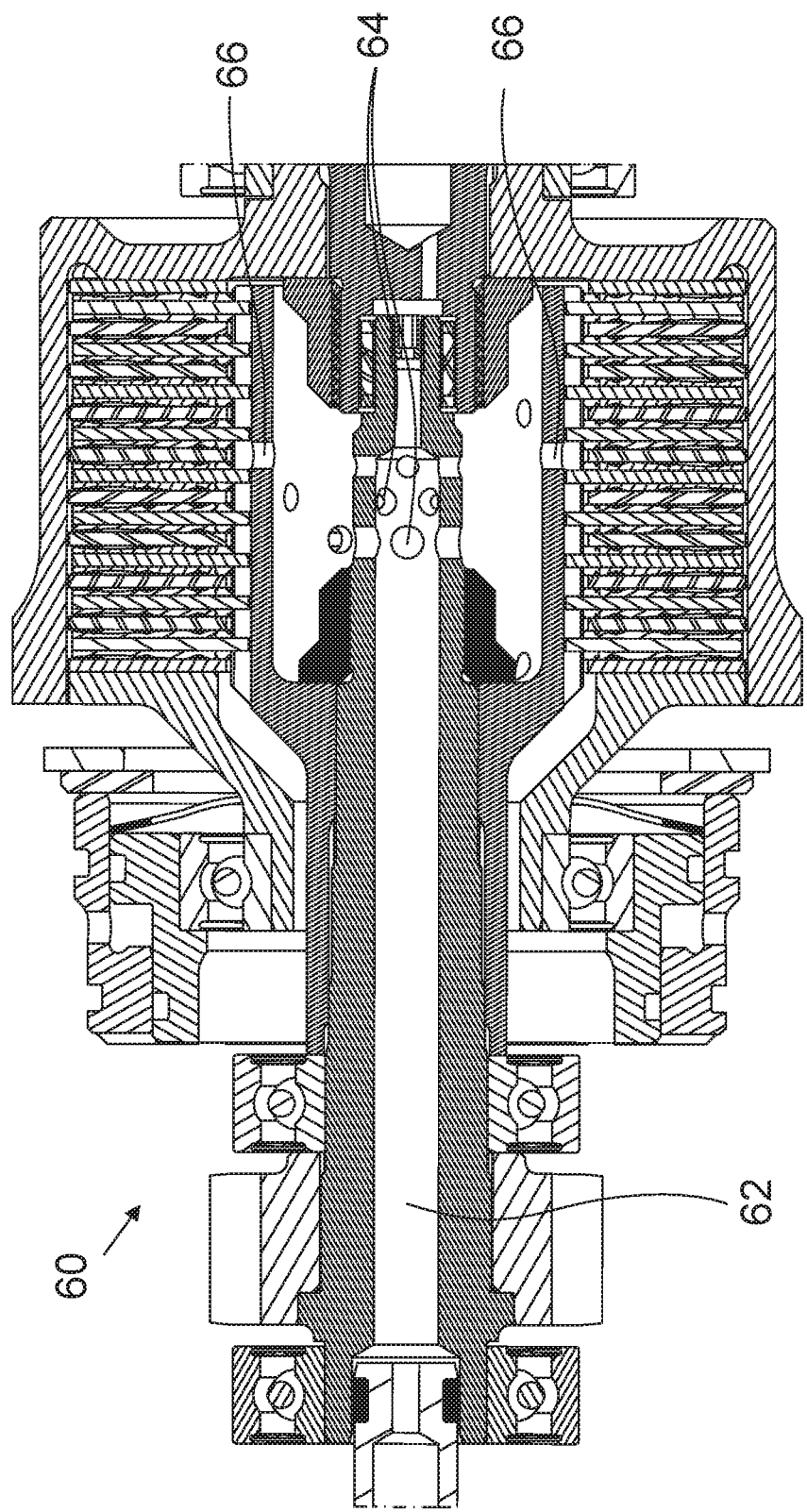
FIG. 5 is a cross-sectional view through section A-A of FIG. 4.

Although clutch slippage is minimized by an appropriate control strategy, wet clutches are used to allow good heat extraction from the clutches. The device 2 includes a clutch lubrication and cooling system 60 for supplying a cooling oil flow to the center of each clutch 10, 12, 14, to control the clutch temperature. An embodiment of the clutch lubrication system is illustrated in FIGS. 4 and 5. Oil is supplied via the central bore 62 of each of the clutch shafts 34, 36, 38, and is distributed in an even manner via apertures 64 as the clutch shaft 34, 36, 38 rotates. Channels 66 allow the oil to enter the interstices of the clutch plates 28, 30.

Furthermore, both sides of the clutch are typically rotating (one with the flywheel and the other with the vehicle transmission input shaft) which helps distribute the cooling lubricant.

Figure 6:
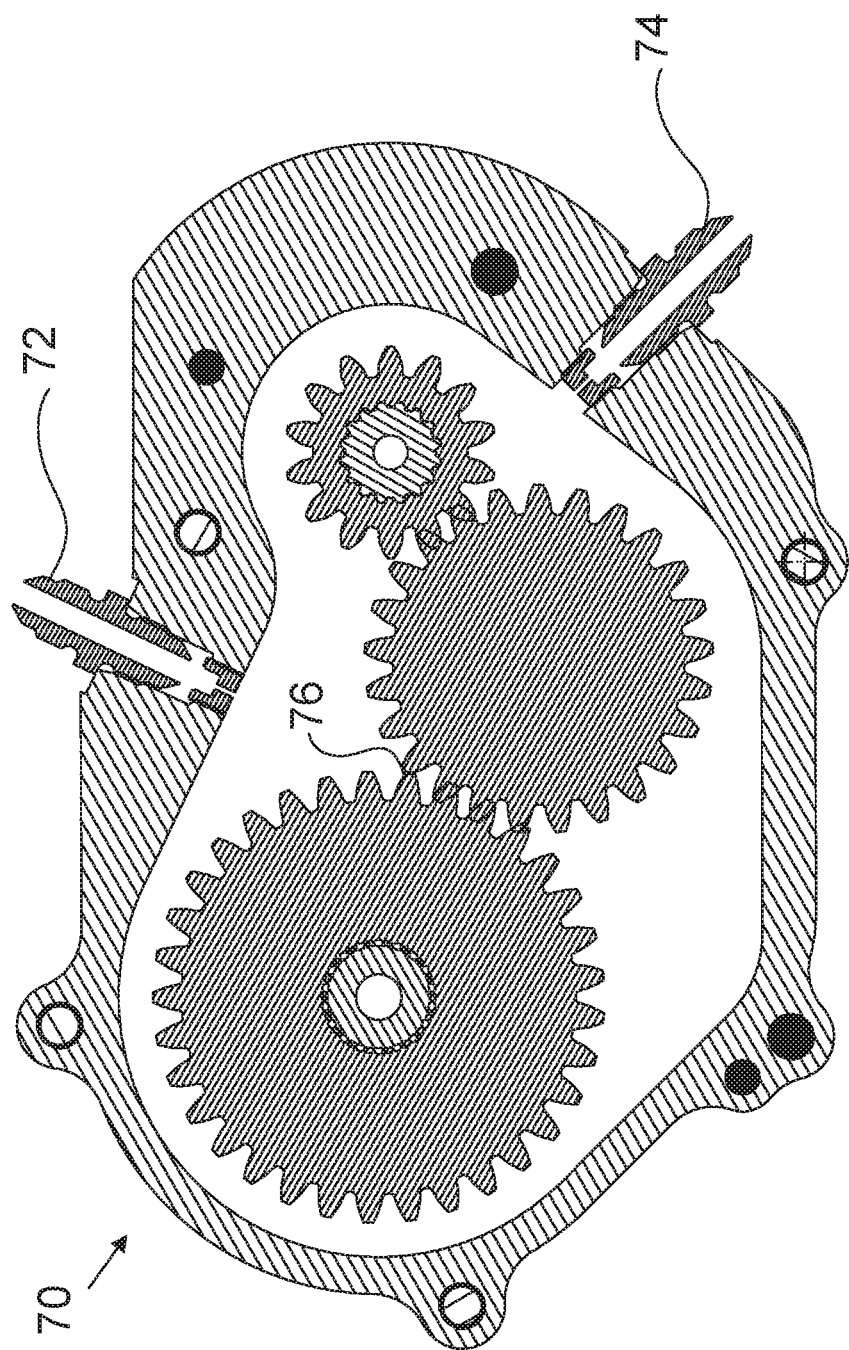
FIG. 6 is a cross sectional view of the squirt jets of the lubrication system of FIG. 4.

The device 2 also includes a gear lubrication system 70, as illustrated in FIG. 6. The gear lubrication system comprises jets 72 and 74 which aim oil at gear teeth 76 as they come out of mesh. The temperature control of the gear teeth via lubrication is particularly important due to the high running speed of the flywheel which generates high temperatures within the gears.

What is claimed is:

1. An energy storage and recovery system device having a first shaft and a second shaft, a control device and a gearbox, wherein the gearbox includes a plurality of clutches and provides a plurality of ratios between the first and second shafts, said clutches and ratios providing a plurality of torque transfer paths between the first and second shafts, at least two of the torque transfer paths having different gear ratios to one another;

wherein the first shaft is couplable to a flywheel arranged for energy storage, and the second shaft is couplable to a vehicle transmission, and wherein the flywheel is not an engine flywheel; and the control device being configured to actuate one of the said clutches to create a normal force on the friction surface of the clutch to adjust the torque transmitted by the clutch, the normal force controlling the operation of the clutch to provide substantially continuous slippage of the clutch throughout the duration of torque transfer through the said clutch the system including a clutch lubrication and cooling system for supplying a cooling oil flow, and wherein the said one clutch is mounted on a clutch shaft, and wherein the clutch lubrication and cooling system includes a central bore of the clutch shaft and an aperture in the clutch shaft via which oil is supplied to the said one clutch.

2. An energy storage and recovery system device as claimed in claim 1, mounted to a vehicle and wherein the control device is arranged to actuate the clutches so that the said normal force is substantially proportional to the vehicle braking or accelerating torque.

3. An energy storage and recovery system device as claimed in claim 1, wherein the control device is configured to select the ratios in the gearbox in order to minimise slippage of the said one clutch.

4. An energy storage and recovery system device as claimed in claim 1 wherein at least two of the said torque transfer paths are configured to allow torque transfer in the same direction as one another.

5. An energy storage and recovery system device as claimed in claim 1, wherein the control device is configured to modulate the actuation force of the said individual actuation of the clutches to modulate torque flow between the first shaft and the second shaft.

6. An energy storage and recovery system device as claimed in claim 1, wherein the control device is configured to actuate at least two of the clutches simultaneously in order to increase the energy dissipated in the gearbox through frictional heating of the clutches.

7. An energy storage and recovery system device for fitting to a vehicle having a prime mover and a vehicle gearbox which provides a plurality of ratios for coupling the prime mover to the vehicle driven wheels and the device having a first shaft and a second shaft, a control device and a flywheel gearbox, wherein the flywheel gearbox includes a plurality of clutches and provides a plurality of ratios between the first and second shafts, said clutches and ratios providing a plurality of torque transfer paths between the first and second shafts;

the first shaft being couplable to a flywheel arranged for energy storage, and the second shaft being couplable to the vehicle at a point between the vehicle prime mover and the vehicle gearbox, and whereby the combined ratio of the coupling between the energy storage flywheel and the vehicle driven wheels is the product of a selected gear ratio in the vehicle gearbox and a selected gear ratio in the flywheel gearbox, the device further including a clutch lubrication and cooling system for supplying a cooling oil flow, and wherein the said one clutch is mounted on a clutch shaft, and wherein the clutch lubrication and cooling system includes a central bore of the clutch shaft and an aperture in the clutch shaft via which oil is supplied to the said one clutch.

8. An energy storage and recovery system device as claimed in claim 7, wherein the control device is configured to actuate one of the said clutches to create a normal force on the friction surface of the clutch to adjust the torque transmitted by the clutch, the normal force controlling the operation of the clutch to provide substantially continuous slippage of the clutch throughout the duration of torque transfer through the said clutch.

9. An energy storage and recovery system device as claimed in claim 7, wherein the control device is configured to select the ratios in the gearbox in order to minimise slippage of the said one clutch.

10. An energy storage and recovery system device as claimed in claim 7, wherein the second shaft is couplable to an input shaft of a transmission of the vehicle.

11. An energy storage and recovery system device as claimed in claim 7, wherein the control device is configured to modulate the actuation force of the said individual actuation of the clutches to modulate torque flow between the first shaft and the second shaft.

12. An energy storage and recovery system device as claimed in claim 7, wherein at least two of the torque transfer paths have different gear ratios to one another.

13. An energy storage and recovery system device as claimed in claim 7, wherein the control device is configured to actuate at least two of the clutches simultaneously in order to increase the energy dissipated in the gearbox through frictional heating of the clutches.

14. An energy storage and recovery system device having a first shaft and a second shaft, a control device and a gearbox, wherein the gearbox includes a plurality of clutches and provides a plurality of ratios between the first and second shafts, said clutches and ratios providing a plurality of torque transfer paths between the first and second shafts, the first shaft being couplable to a flywheel arranged for energy storage, and the second shaft being couplable to a vehicle transmission; and the control device being configured to actuate at least two of the clutches simultaneously in order to increase the energy dissipated in the gearbox through frictional heating of the clutches, the system further including a clutch lubrication and cooling system for supplying a cooling oil flow, and wherein the said one clutch is mounted on a clutch shaft, and wherein the clutch lubrication and cooling system includes a central bore of the clutch shaft and an aperture in the clutch shaft via which oil is supplied to the said one clutch.

15. An energy storage and recovery system device as claimed in claim 14, wherein at least two of the torque transfer paths have different gear ratios to one another.

16. An energy storage and recovery system device as claimed in 14, wherein the control device is operable to simultaneously actuate the at least two clutches to increase frictional heating of the said clutches in order to slow down the flywheel, prevent overspeed of the flywheel, or provide additional braking to the vehicle.

17. An energy storage and recovery system device as claimed in 14, for fitting to a vehicle having a prime mover such as an internal combustion engine and a vehicle gearbox which provides a plurality of ratios for coupling the prime mover to the vehicle driven wheels, wherein the second shaft is couplable to the vehicle at a point between the vehicle prime mover and a vehicle gearbox, and whereby the effective ratio of the coupling between the energy storage flywheel and the vehicle driven wheels is determined from the product of a ratio in the vehicle gearbox and a said ratio in the energy storage and recovery system device.

18. An energy storage and recovery system device as claimed in claim 14, wherein the control device is configured to modulate the actuation force of at least one of the clutches to modulate torque flow between the first shaft and the second shaft.

* * * * *